United States Patent
Mori et al.

(10) Patent No.: US 9,784,164 B2
(45) Date of Patent: Oct. 10, 2017

(54) ON-SITE REGENERATION METHOD OF DENITRATION CATALYST IN EXHAUST GAS PURIFICATION SYSTEM

(71) Applicant: Hitachi Zosen Corporation, Osaka-shi (JP)

(72) Inventors: Takuma Mori, Osaka (JP); Susumu Hikazudani, Osaka (JP); Kiyoshirou Umeo, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 14/781,085

(22) PCT Filed: Feb. 12, 2014

(86) PCT No.: PCT/JP2014/053161
§ 371 (c)(1),
(2) Date: Sep. 29, 2015

(87) PCT Pub. No.: WO2014/156346
PCT Pub. Date: Oct. 2, 2014

(65) Prior Publication Data
US 2016/0305303 A1    Oct. 20, 2016

(30) Foreign Application Priority Data

Mar. 29, 2013   (JP) .................. 2013-072242

(51) Int. Cl.
*F01N 3/22*       (2006.01)
*F01N 3/30*       (2006.01)
(Continued)

(52) U.S. Cl.
CPC ......... *F01N 3/306* (2013.01); *B01D 53/8631* (2013.01); *B01D 53/94* (2013.01);
(Continued)

(58) Field of Classification Search
CPC ........ F01N 3/0885; F01N 3/106; F01N 3/306; F01N 2240/02; F01N 2610/08
See application file for complete search history.

(56) References Cited

U.S. PATENT DOCUMENTS 3,986,350 A * 10/1976 Schmidt ............. B01D 53/9454
                                                                    123/3
2005/0228572 A1   10/2005   Mansbart
(Continued)

FOREIGN PATENT DOCUMENTS

| CN | 101298845 A | 11/2008 |
| GB | 2448993 A | 11/2008 |

(Continued)

OTHER PUBLICATIONS

International Search Report mailed May 13, 2014, issued for PCT/JP2014/053161.
(Continued)

*Primary Examiner* — Jonathan Matthias
(74) *Attorney, Agent, or Firm* — Locke Lord LLP

(57) ABSTRACT

In an exhaust gas purification system provided with a denitration catalyst layer, a reducing agent oxidation catalyst layer is installed together; a reducing agent and air are supplied into the reducing agent oxidation catalyst layer at the time of catalyst regeneration of the denitration catalyst layer; a high-temperature oxidation reaction gas is produced by a reaction heat generated by an oxidation reaction of the reducing agent and the air in this reducing agent oxidation catalyst layer; and this high-temperature oxidation reaction gas is introduced into the denitration catalyst layer to heat the denitration catalyst, thereby recovering a denitration performance of the catalyst.

6 Claims, 3 Drawing Sheets

(51) Int. Cl.
| | |
|---|---|
| *B01J 38/02* | (2006.01) |
| *B01J 29/46* | (2006.01) |
| *B01J 29/90* | (2006.01) |
| *F01N 3/10* | (2006.01) |
| *F01N 3/20* | (2006.01) |
| *B01D 53/86* | (2006.01) |
| *B01D 53/94* | (2006.01) |
| *B01J 38/04* | (2006.01) |
| *B01J 23/42* | (2006.01) |
| *B01J 23/96* | (2006.01) |
| *B01D 53/96* | (2006.01) |
| *F01N 3/08* | (2006.01) |

(52) U.S. Cl.
CPC ..... *B01D 53/9418* (2013.01); *B01D 53/9431* (2013.01); *B01D 53/96* (2013.01); *B01J 23/42* (2013.01); *B01J 23/96* (2013.01); *B01J 29/46* (2013.01); *B01J 29/90* (2013.01); *B01J 38/02* (2013.01); *B01J 38/04* (2013.01); *F01N 3/08* (2013.01); *F01N 3/106* (2013.01); *F01N 3/20* (2013.01); *F01N 3/2006* (2013.01); *F01N 3/2066* (2013.01); *F01N 3/22* (2013.01); *F01N 3/30* (2013.01); *B01D 2251/208* (2013.01); *B01D 2255/20746* (2013.01); *B01D 2255/504* (2013.01); *B01D 2257/404* (2013.01); *B01D 2258/012* (2013.01); *F01N 2240/02* (2013.01); *F01N 2260/04* (2013.01); *F01N 2330/06* (2013.01); *F01N 2370/04* (2013.01); *F01N 2510/06* (2013.01); *F01N 2590/02* (2013.01); *F01N 2610/03* (2013.01); *F01N 2610/08* (2013.01); *Y02T 10/24* (2013.01); *Y02T 10/26* (2013.01)

(56) References Cited

U.S. PATENT DOCUMENTS

| | | | |
|---|---|---|---|
| 2006/0021332 A1* | 2/2006 | Gaiser | F01N 3/0256 60/286 |
| 2013/0061579 A1 | 3/2013 | Kotrba et al. | |

FOREIGN PATENT DOCUMENTS

| | | |
|---|---|---|
| JP | 08-200048 A | 8/1996 |
| JP | 08-200048 A | 8/1996 |
| JP | 2000-018024 A | 1/2000 |
| JP | 2006-509947 A | 3/2006 |
| JP | 2006-220107 A | 8/2006 |
| JP | 2009-092015 A | 4/2009 |
| JP | 2010-216267 A | 9/2010 |
| WO | 2011/119331 A2 | 9/2011 |

OTHER PUBLICATIONS

Official Letter, dated Feb. 17, 2017, from the State Intellectual Property Office of the Peoples Republic of China, issued for CN Application No. 201480018554.2.

European Search Report, mailed Jan. 11, 2017, issued for EP Application No. 14774245.6.

* cited by examiner

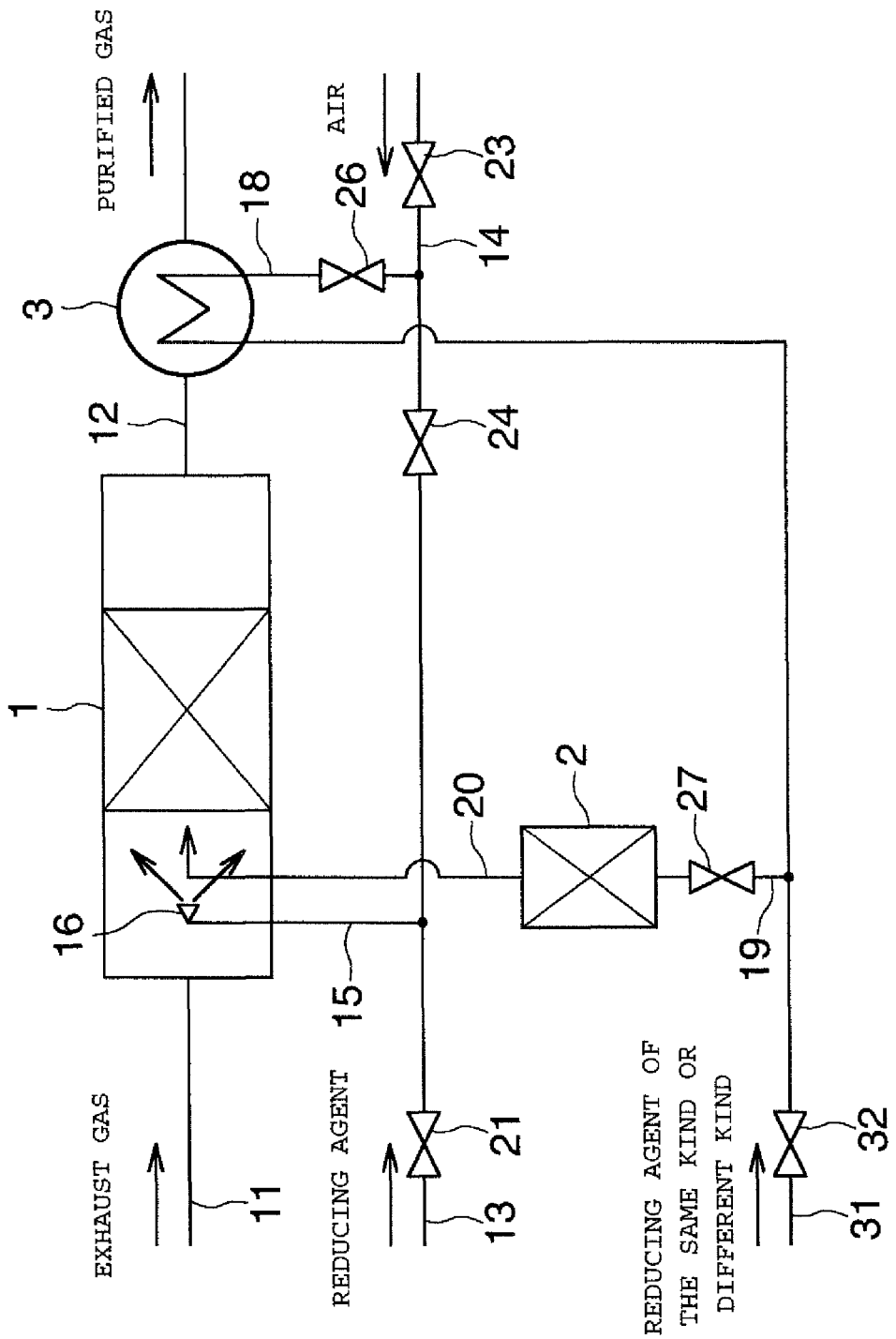

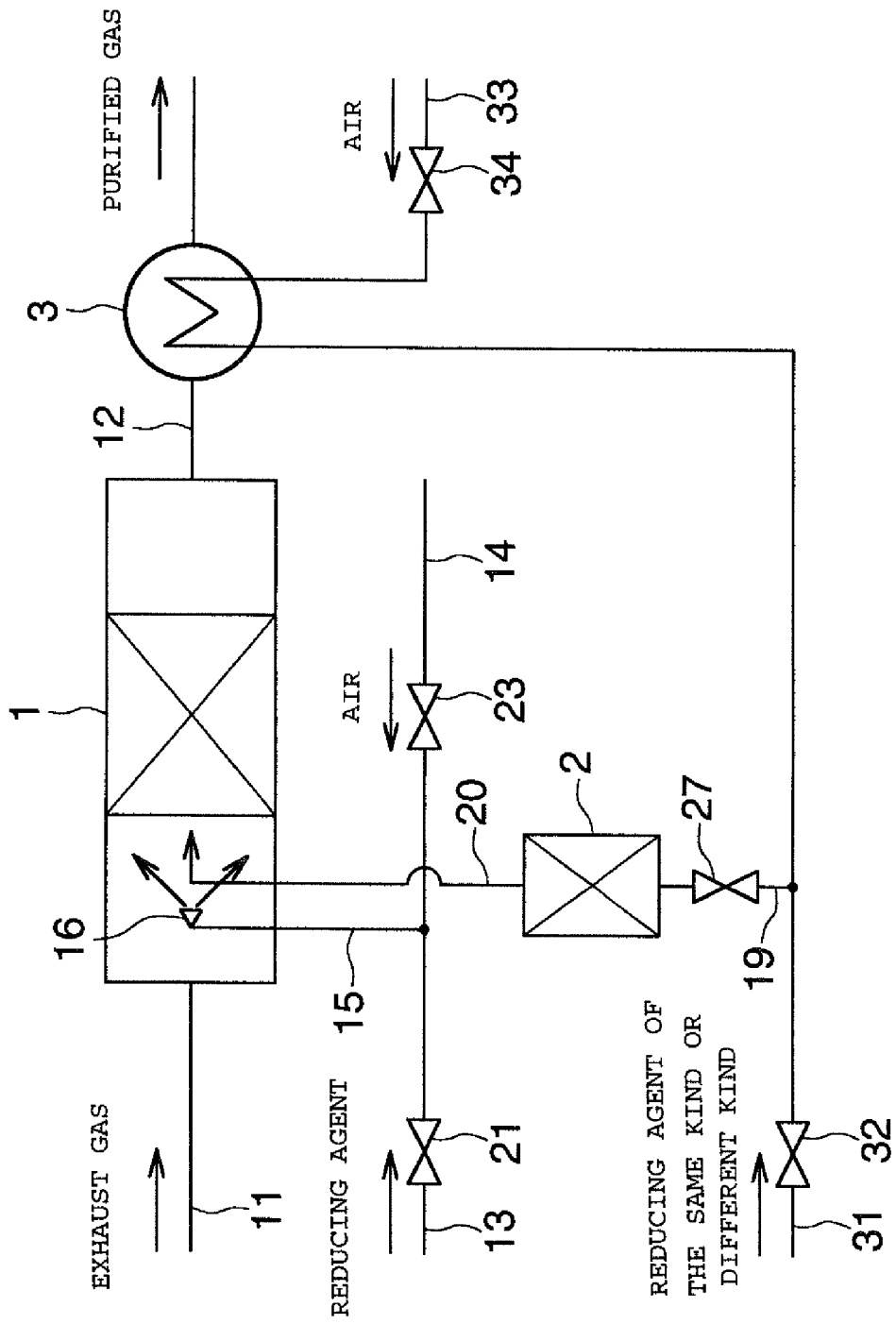

ON-SITE REGENERATION METHOD OF DENITRATION CATALYST IN EXHAUST GAS PURIFICATION SYSTEM

TECHNICAL FIELD

The present invention relates to an on-site regeneration method of a denitration catalyst in an exhaust gas purification system, in which a liquid reducing agent, such as alcohols, hydrocarbons, etc., is added in a purification system in an exhaust gas of an internal combustion engine or the like, in more detail a purification system of an exhaust gas of an internal combustion engine, for example, marine diesel engines, etc., or the like, to remove nitrogen oxides (NOx) and also make it possible to recover a performance of the denitration catalyst.

BACKGROUND ART

In accordance with the International Convention for the Prevention of Pollution from Ships (MARPOL Convention), engines operating in the emission control areas (ECAs) must use emission controls that achieve an about 80% reduction in NOx emissions, with respect to ships newly built on or after 2016.

Conventionally, in SCR (selective catalytic reduction) denitration equipment installed in an exhaust passage of an internal combustion engine, for example, diesel engines, etc., or the like, a denitration reaction is not sufficient in a low-temperature exhaust gas atmosphere where an exhaust gas temperature of a vessel is 300° C. or lower, and a denitration catalyst is poisoned by ammonium hydrogen sulfate (acidic ammonium sulfate) resulting from a reaction between a sulfur content contained in fuel oil and an ammonia component of a reducing agent. Thus, there was involved such a problem that it is difficult to achieve practical implementation.

Meanwhile, there are known denitration catalysts using an alcohol as a reducing agent and utilizing a zeolite capable of undergoing denitration in a low temperature region of about 180 to 300° C. In those low-temperature active denitration catalysts, there is confirmed such a problem that the performance is lowered with a lapse of time during the denitration reaction due to deposition (caulking) of a carbon component derived from the alcohol used as the reducing agent onto the denitration catalyst.

In addition, it is confirmed that by extracting such a denitration catalyst whose performance has been lowered and heat treating it, the deposited carbon component detaches, whereby the performance is recovered.

For example, PTL 1 as described below discloses a method of reducing and removing NOx in an exhaust gas by using an alcohol and/or an ether, such as methanol and/or dimethyl ether, etc., as a reducing agent and a denitration catalyst of a proton-type β zeolite; and discloses a denitration catalyst regeneration system in which on that occasion, a denitration catalyst layer is disposed in each of exhaust gas treatment passages of branched at least two systems, one of the exhaust gas treatment passages is closed to stop the supply of the exhaust gas, and while continuing an exhaust gas treatment in the other exhaust gas treatment passage, the denitration catalyst layer of the exhaust gas treatment passage where the supply of the exhaust gas is stopped is heat treated (directly heated by a heater) at 350 to 800° C. on site, thereby recovering the lowered denitration performance.

In addition, in FIG. 2 of PTL 2 as described below, there are disclosed a denitration catalyst regeneration system as function recovery structure of a denitration catalyst of an exhaust treatment apparatus of automobile, in which a first reducing agent-charging pipe for charging a reducing agent at all times and a second reducing agent-charging pipe for charging a reducing agent in due time are installed, and furthermore, in which an oxidation catalyst is inserted with respect to regulation of a reducing agent supply pressure in association with an increase of a back pressure on the upstream side of the denitration catalyst. In the denitration catalyst regeneration system described in this PTL 2, it is described that the exhaust passing through the oxidation catalyst is activated even at the normal time, whereby the reactivity in the sequent denitration catalyst is increased, and furthermore, at the time when the function of the denitration catalyst is lowered due to deposition of a combustion residue, the activity of the oxidation catalyst is more increased by charging the reducing agent from the second system, thereby promoting perfect combustion of the combustion residue.

CITATION LIST

Patent Literature

PTL 1: JP-A-2006-220107
PTL 2: JP-A-8-200048

SUMMARY OF THE INVENTION

Problem to be Solved by the Invention

However, in the denitration catalyst purification system described in the above-described PTL 1, when the practical aspect (for example, vessels, etc.) is taken into consideration, there were involved such problems that the installation of a heater as a heat treatment means in a catalytic reactor section to regenerate the denitration catalyst results in not only increasing in size of equipment but also increasing in the cost of equipment; and that since the heater is operated by an electric power, the running cost is high.

In addition, even in the case of obtaining a heat source for the heater by heat exchange not from the electric power but from an exhaust gas, when an exhaust gas temperature (about 300° C.) of the internal combustion engine is taken into consideration, there was involved such a problem that it is difficult to heat the denitration catalyst in a temperature region of 350 to 800° C. required for recovery of the catalyst.

In addition, in the denitration catalyst purification system described in FIG. 2 of the above-described PTL 2, since the system is arranged such that the exhaust gas is always circulated in the oxidation catalyst, there was involved such a problem that the oxidation catalyst itself becomes deteriorated due to general catalytic poisoning components (for example, S, P, Cl, etc.) contained in the exhaust gas.

An object of the present invention is to solve the above-described problems of the background art and provide an on-site regeneration method of a denitration catalyst in an exhaust gas purification system with excellent practicability, in which in an exhaust gas purification system not only using a denitration catalyst for nitrogen oxide reduction in a relatively low temperature region where an exhaust gas temperature is about 200 to 400° C. as in, for example, an exhaust gas of marine diesel engines but also adding a reducing agent, such as alcohols or hydrocarbons, etc., a carbon component deposited on the denitration catalyst is removed by an appropriate heat treatment, whereby a denitration catalyst performance can be recovered, and the heat treatment is performed on site, namely on a job site by using the reducing agent, air, and a reducing agent oxidation catalyst layer as exclusively installed, without using a conventional special heating apparatus or a fuel, thereby making it possible to regenerate the denitration catalyst.

Means for Solving the Problem

In view of the foregoing circumstances, the present inventors made extensive and intensive investigations. As a result, it has been found that in performing the regeneration of a denitration catalyst by heating on site in a purification system of an exhaust gas of, for example, marine diesel engines, in a relatively low temperature region where an exhaust gas temperature is about 200 to 400° C., an oxidation heat of a reducing agent is utilized for a heat source; at the normal time, the reducing agent is utilized for a denitration reaction, whereas at the time of regeneration, a passage of the reducing agent is changed to introduce the reducing agent into an oxidation catalyst layer, thereby obtaining an oxidation heat by an oxidation reaction of the reducing agent; on that occasion, air heated by heat exchange with the exhaust gas by a heat exchanger is utilized as the heat source for causing the oxidation reaction; and after the regeneration treatment of the denitration catalyst, the passage of the reducing agent is changed, thereby enabling the system to return to the normal time (denitration reaction), leading to accomplishment of the present invention.

In order to achieve the foregoing object, an invention as set forth in claim 1 is concerned with an on-site regeneration method of a denitration catalyst in an exhaust gas purification system, which is characterized in that in an exhaust gas purification system of purifying an exhaust gas by adding a reducing agent-entrained air to an exhaust gas on the upstream side of a denitration catalyst layer installed in an exhaust passage of an internal combustion engine and reducing nitrogen oxides in the exhaust gas in the denitration catalyst layer, thereby purifying the exhaust gas, a reducing agent oxidation catalyst layer is installed together; a reducing agent and air are supplied into the reducing agent oxidation catalyst layer at the time of catalyst regeneration of the denitration catalyst layer; a high-temperature oxidation reaction gas is produced by a reaction heat generated by an oxidation reaction of the reducing agent and the air in this reducing agent oxidation catalyst layer; and this high-temperature oxidation reaction gas is introduced into the denitration catalyst layer to heat the denitration catalyst, thereby regenerating the denitration catalyst.

An invention as set forth in claim 2 is concerned with the on-site regeneration method of a denitration catalyst in an exhaust gas purification system according to claim 1, which is characterized in that a heating temperature of the denitration catalyst by the high-temperature oxidation reaction gas is 500° C. or higher and 800° C. or lower.

An invention as set forth in claim 3 is concerned with the on-site regeneration method of a denitration catalyst in an exhaust gas purification system according to claim 1 or 2, which is characterized in that a reducing agent supply branch line is provided on the way of a reducing agent supply main line for supplying the reducing agent into the exhaust gas on the upstream side of the denitration catalyst layer; meanwhile, an air supply branch line is provided on the way of an air supply main line for supplying air into the exhaust gas on the upstream side of the denitration catalyst layer; these reducing agent supply branch line and air supply branch line are connected to the reducing agent oxidation catalyst layer; and at the time of catalyst regeneration of the denitration catalyst layer, not only the supply of the reducing agent is switched from the reducing agent supply main line to the reducing agent supply branch line, but also the supply of air is switched from the air supply main line to the air supply branch line, thereby supplying the reducing agent and air into the reducing agent oxidation catalyst layer.

An invention as set forth in claim 4 is concerned with the on-site regeneration method of a denitration catalyst in an exhaust gas purification system according to claim 1 or 2, which is characterized in that a reducing agent supply sub line for supplying a reducing agent of the same kind as or a reducing agent of a different kind from the reducing agent to be supplied into the exhaust gas on the upstream side of the denitration catalyst layer is connected to the reducing agent oxidation catalyst layer; meanwhile, an air supply branch line is provided on the way of an air supply main line for supplying air into the exhaust gas on the upstream side of the denitration catalyst layer; this air supply branch line is connected to the reducing agent oxidation catalyst layer; and at the time of catalyst regeneration of the denitration catalyst layer, not only the reducing agent of the same or the reducing agent of a different kind is supplied from the reducing agent supply sub line into the reducing agent oxidation catalyst layer, but also the supply of air is switched from the air supply main line to the air supply branch line, thereby supplying air into the reducing agent oxidation catalyst layer.

An invention as set forth in claim 5 is concerned with the on-site regeneration method of a denitration catalyst in an exhaust gas purification system according to claim 1 or 2, which is characterized in that the reducing agent oxidation catalyst layer is provided with a reducing agent supply sub line for supplying a reducing agent of the same kind as or a reducing agent of a different kind from the reducing agent to be supplied into the exhaust gas on the upstream side of the denitration catalyst layer and an air supply sub line for supplying air into the reducing agent oxidation catalyst layer separately from a reducing agent supply main line for supplying a reducing agent into the exhaust gas on the upstream side of the denitration catalyst layer and an air supply main line for supplying air, respectively; and at the time of catalyst regeneration of the denitration catalyst layer, not only the reducing agent of the same or the reducing agent of a different kind is supplied from the reducing agent supply sub line into the reducing agent oxidation catalyst layer, but also air is supplied from the air supply sub line.

An invention as set forth in claim 6 is concerned with the on-site regeneration method of a denitration catalyst in an exhaust gas purification system according to any one of claims 1 to 5, which is characterized in that a heat exchanger for air heating is installed in an exhaust passage on the downstream side of the denitration catalyst layer; in the heat exchanger, air is heated by an exhaust heat of a purified exhaust gas discharged from the denitration catalyst layer; and this heated air is supplied into the reducing agent oxidation catalyst layer, thereby causing an oxidation reaction of the reducing agent and the air.

An invention as set forth in claim 7 is concerned with the on-site regeneration method of a denitration catalyst in an exhaust gas purification system according to any one of claims 1 to 3, which is characterized in that the reducing agent is at least one organic compound selected from the group consisting of alcohols, ethers, ketones, and hydrocarbons, and air is added to the exhaust gas on the upstream side of the denitration catalyst layer together with a vaporized reducing agent.

Advantageous Effects of the Invention

In accordance with the on-site regeneration method of a denitration catalyst in an exhaust gas purification system according to the present invention, a carbon component deposited on the denitration catalyst is removed by an appropriate heat treatment, whereby a denitration catalyst performance can be recovered, and the heat treatment is performed on site, namely on a job site by using a reducing agent, air, and a reducing agent oxidation catalyst layer as exclusively installed, without using a conventional special heating apparatus or a fuel, thereby making it possible to regenerate the denitration catalyst.

BRIEF DESCRIPTION OF DRAWINGS

FIG. 2 is a flow sheet showing a second embodiment of an apparatus for carrying out an on-site regeneration method of a denitration catalyst in an exhaust gas purification system according to the present invention.

FIG. 3 is a flow sheet showing a third embodiment of an apparatus for carrying out an on-site regeneration method of a denitration catalyst in an exhaust gas purification system according to the present invention.

MODES FOR CARRYING OUT THE INVENTION

Figure 1:
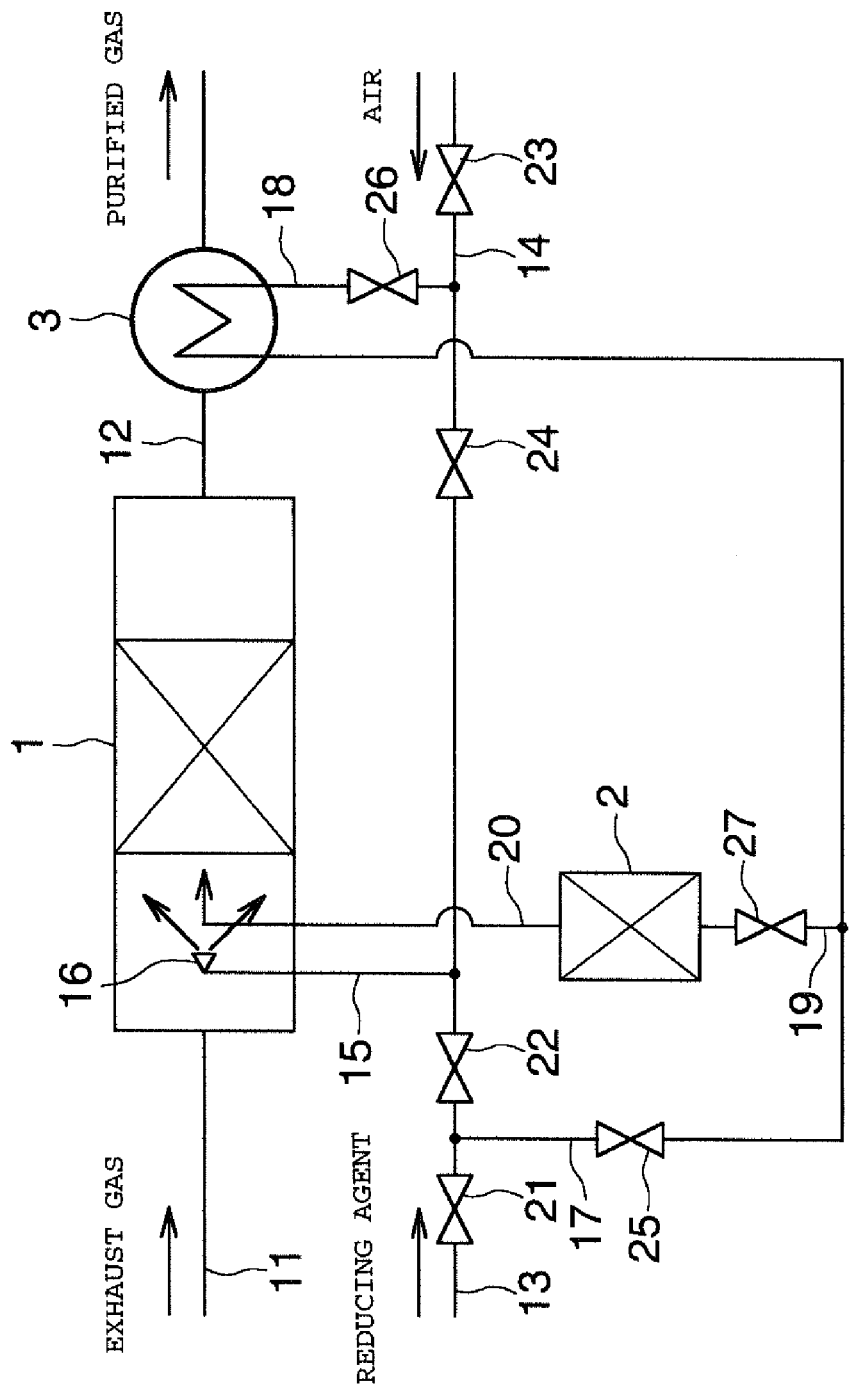
FIG. 1 is a flow sheet showing a first embodiment of an apparatus for carrying out an on-site regeneration method of a denitration catalyst in an exhaust gas purification system according to the present invention.

Next, embodiments of the present invention are explained by reference to the accompanying drawings, but it should not be construed that the present invention is limited thereto.

FIG. 1 is a flow sheet showing a first embodiment of an apparatus for carrying out an on-site regeneration method of a denitration catalyst in an exhaust gas purification system according to the present invention.

When referring to FIG. 1, in purifying an exhaust gas of an internal combustion engine, such as marine diesel engines, etc., the exhaust gas purification system carries out a denitration catalyst (for example, Co/zeolite) system capable of undergoing denitration in a low temperature region of about 180 to 300° C. by using an alcohol or the like (for example, ethanol) as a reducing agent. In this system, the reducing agent is mixed with air, introduced into a denitration catalyst reactor, and dispersed over the whole of the catalyst.

That is, a reducing agent-entrained air is added to an exhaust gas on the upstream side of a denitration catalyst layer (1) installed in an exhaust passage (line) (11) of an internal combustion engine, to reduce nitrogen oxides in the exhaust gas in the denitration catalyst layer (1). A purified gas which has been purified in the denitration catalyst layer (1) is discharged outside from an exhaust line (12).

Here, the reducing agent (for example, ethanol) is supplied by a line (13), whereas the air is supplied by a line (14). The reducing agent supply main line (13) and the air supply main line (14) are connected to a merge line (15), and the reducing agent is mixed with the air, introduced from the merge line (15) into the denitration catalyst layer (1) by a nozzle (16), and dispersed over the whole of the catalyst.

Valves (21) and (22) are provided in the reducing agent supply main line (13), and valves (23) and (24) are provided in the air supply main line (14).

Examples of the denitration catalyst which is filled in the denitration catalyst layer (1) include catalysts having cobalt supported on zeolite, catalysts having vanadium supported on $TiO_2$, and catalysts having tungsten or molybdenum supported on $TiO_2$; however, other catalysts may also be used so long as they are able to subject NOx to a reduction treatment.

In this embodiment, a honeycomb structure having cobalt/zeolite as the denitration catalyst supported thereon was filled. Here, the honeycomb structure is preferably one made of a glass paper. This honeycomb structure is preferably one produced by, for example, carrying out a step of calcining a commercially available glass paper to remove an organic binder component contained in the glass paper by burning; a step of coating a slurry containing cobalt/zeolite as the denitration catalyst on the glass paper from which the organic binder component has been removed; a step of forming the catalyst-containing slurry-coated glass paper in a corrugated plate shape; a step of drying the catalyst-containing slurry-coated glass paper formed in a corrugated plate shape; in the meanwhile, a step of drying a catalyst slurry-coated glass paper in a flat plate shape, which is not formed in a corrugated plate shape; a step of calcining the catalyst-containing slurry-coated glass paper in a corrugated plate shape and the catalyst slurry-coated glass paper in a flat plate shape, to form a catalyst-supported glass paper in a flat plate shape and a catalyst-supported glass paper in a corrugated plate shape; and a step of alternately stacking the catalyst-supported glass paper in a flat plate shape and the catalyst-supported glass paper in a corrugated plate shape after the calcination without being bonded, to form a catalyst-supported honeycomb structure.

Alternatively, the honeycomb structure is preferably one produced by, for example, carrying out a step of coating a slurry containing cobalt/zeolite as the denitration catalyst on a commercially available glass paper without removing an organic binder component contained in the commercially available glass paper by burning; a step of forming the catalyst-containing slurry-coated glass paper in a corrugated plate shape; a step of drying the catalyst-containing slurry-coated glass paper formed in a corrugated plate shape; in the meanwhile, a step of drying a catalyst slurry-coated glass paper in a flat plate shape, which is not formed in a corrugated plate shape, without removing an organic binder component contained in the commercially available glass paper by burning; a step of calcining the catalyst-containing slurry-coated glass paper in a corrugated plate shape and the catalyst slurry-coated glass paper in a flat plate shape, to form a catalyst-supported glass paper in a flat plate shape and a catalyst-supported glass paper in a corrugated plate shape; and a step of alternately stacking the catalyst-supported glass paper in a flat plate shape and the catalyst-supported glass paper in a corrugated plate shape after the calcination without being bonded, to form a catalyst-supported honeycomb structure.

Then, when the performance of the denitration catalyst filled in the denitration catalyst layer (1) has been lowered with a lapse of time, a regeneration treatment of the denitration catalyst is carried out by the on-site regeneration method of a denitration catalyst according to the present invention.

As shown in FIG. 1, a reducing agent oxidation catalyst layer (2) is installed together relative to the denitration catalyst layer (1). Then, a branch line (17) is connected to the reducing agent supply main line (13) between the valve (21) and the valve (22) of the line (13), whereas a branch line (18) is connected to the air supply main line (14) between the valve (23) and the valve (24) of the line (14); the reducing agent supply branch line (17) and the air supply branch line (18) are merged into a line (19); the reducing agent is mixed with air and supplied into the reducing agent oxidation catalyst layer (2) by the merge line (19); at the time of catalyst regeneration of the denitration catalyst layer (1), a high-temperature oxidation reaction gas is produced by a reaction heat generated by an oxidation reaction of the reducing agent and the air in this reducing agent oxidation catalyst layer (2); and this high-temperature oxidation reaction gas is introduced from a line (20) into the denitration catalyst layer (1) to heat the denitration catalyst, thereby regenerating the denitration catalyst.

Here, a valve (25) is provided in the reducing agent supply branch line (17), a valve (26) is provided in the air supply branch line (18), and a valve (27) is provided in the merge line (19).

In addition, a heat exchange (3) for air heating is installed in the exhaust line (12) on the downstream side of the denitration catalyst layer (1); and it is preferred that in the heat exchange (3), the air passing within the air supply branch line (18) is heated by an exhaust heat of the purified exhaust gas discharged from the denitration catalyst layer (1), and this heated air is merged with the reducing agent and supplied into the reducing agent oxidation catalyst layer (2), thereby causing an oxidation reaction of the reducing agent and the air. The purified gas discharged from the denitration catalyst layer (1) is allowed to pass through the heat exchanger (3) via the line (12), cooled here by means of heat exchange, and then discharged outside.

In the on-site regeneration method of a denitration catalyst in an exhaust gas purification system according to the present invention, a heating temperature of the denitration catalyst by the high-temperature oxidation reaction gas in the denitration catalyst layer (1) is preferably 500° C. or higher and 800° C. or lower.

A reason why the heating temperature of the denitration catalyst by the oxidation reaction gas is set to 800° C. or lower resides in the matter that the denitration performance itself is lowered because of breakage of a crystal structure of the zeolite.

The compound which can be used as the liquid reducing agent is preferably at least one low-molecular weight organic compound selected from the group consisting of alcohols, such as methanol, ethanol, propanol, etc., ethers, such as diethyl ether, etc., ketones, such as methyl ethyl ketone, etc., and hydrocarbons, such as gas oil, kerosene, gasoline, etc.

In the first embodiment of the on-site regeneration method of a denitration catalyst in an exhaust gas purification system according to the present invention as shown in FIG. 1, the reducing agent supply branch line (17) is provided on the way of the reducing agent supply main line (13) for supplying a reducing agent into the exhaust gas on the upstream side of the denitration catalyst layer (1), whereas the air supply branch line (18) is provided on the way of the air supply main line (14) for supplying air into the exhaust gas on the upstream side of the denitration catalyst layer (1), and these reducing agent supply branch line (17) and air supply branch line (18) are connected to the merge line (19) going to the reducing agent oxidation catalyst layer (2).

Then, at the time of catalyst regeneration of the denitration catalyst layer (1), not only the valve (22) of the reducing agent supply main line (13) is closed, and the valve (25) of the reducing agent supply branch line (17) is opened, thereby switching the supply of the reducing agent (for example, ethanol) from the reducing agent supply main line (13) to the reducing agent supply branch line (17), but also the valve (24) of the air supply main line (14) is closed, and the valve (26) of the air supply branch line (18) is opened, thereby switching the supply of air from the air supply main line (14) to the air supply branch line (18); and in the heat exchanger (3) installed in the exhaust line (12) on the downstream side of the denitration catalyst layer (1), the air passing within the air supply branch line (18) is heated by an exhaust heat of the purified exhaust gas, and this heated air is merged with the reducing agent in the merge line (19) and supplied into the reducing agent oxidation catalyst layer (2).

In this first embodiment, the heat exchanger (3) for air heating is installed in the purified gas exhaust line (12) on the downstream side of the denitration catalyst layer (1), and in the heat exchanger (3), the air is heated to a starting temperature (for example, 200° C.) of the oxidation catalyst or higher by utilizing the exhaust heat of the purified exhaust gas discharged from the denitration catalyst layer (1). The air thus heated to the starting temperature of the oxidation catalyst or higher is introduced into the oxidation catalyst layer (2).

In the reducing agent oxidation catalyst layer (2), the introduced reducing agent is oxidized with an oxidation catalyst (for example, $Pt/Al_2O_3$), and the air is heated by its oxidation heat. The thus heated air is introduced into the denitration catalyst layer (1) to make the circulating gas temperature within the denitration catalyst layer (1) to 500° C. or higher. Then, by heating the catalyst by the circulating gas at 500° C. or higher, the denitration catalyst is regenerated. After heating for a prescribed time (for example, one hour), the passages of the air and the reducing agent are returned to the original states, respectively.

The oxidation catalyst of the oxidation catalyst layer (2) for oxidizing the reducing agent is not limited only to general $Pt/Al_2O_3$. As a catalyst metal, it is possible to select platinum group metals, such as Ru, Rh, Pd, Os, Ir, Pt, Au, etc., transition metals, such as Fe, Ni, Co, etc., or composites of two or more kinds thereof; and as a carrier, it is possible to select metal oxides, such as $Al_2O_3$, $SiO_2$, $TiO_2$, $SnO_2$, $CeO_2$, etc.

FIG. 2 is a flow sheet showing a second embodiment of an apparatus for carrying out an on-site regeneration method of a denitration catalyst in an exhaust gas purification system according to the present invention.

When referring to FIG. 2, a point at which this second embodiment is different from the case of the first embodiment of the present invention as described above resides in the matter that a reducing agent of the same kind as or a reducing agent of a different kind from the reducing agent to be supplied into the exhaust gas on the upstream side of the denitration catalyst layer (1) is supplied into the reducing agent oxidation catalyst layer (2). That is, a reducing agent supply sub line (31) for supplying a reducing agent of the same kind as or a reducing agent (for example, methanol) of a different kind from the reducing agent (for example, ethanol) to be supplied into the exhaust gas on the upstream side of the denitration catalyst layer (1) is connected to the merge line (19) going to the reducing agent oxidation catalyst layer (2). A valve (32) is provided in the reducing agent supply sub line (31). Meanwhile, with respect to the supply of air, similar to the case of the first embodiment as described above, the air supply branch line (18) is provided on the way of the air supply main line (14) for supplying air into the exhaust gas on the upstream side of the denitration catalyst layer (1), and this air supply branch line (18) is connected to the merge line (19) going to the reducing agent oxidation catalyst layer (2).

Then, at the time of catalyst regeneration of the denitration catalyst layer (1), not only the valve (21) of the reducing agent supply main line (13) is closed, and the valve (32) of the reducing agent supply sub line (31) is opened, thereby switching the supply of the reducing agent to supply the reducing agent of the same kind or the reducing agent (for example, methanol) of a different kind from the reducing agent supply sub line (31) into the reducing agent oxidation catalyst layer (2), but also the valve (24) of the air supply main line (14) is closed, and the valve (26) of the air supply branch line (18) is opened, thereby switching the supply of air from the air supply main line (14) to the air supply branch line (18); and in the heat exchanger (3) installed in the exhaust line (12) on the downstream side of the denitration catalyst layer (1), the air passing within the air supply branch line (18) is heated by an exhaust heat of the purified exhaust gas, and this heated air is merged with the reducing agent and supplied into the reducing agent oxidation catalyst layer (2).

In the second embodiment of the present invention, other points are the same as those in the case of the first embodiment of the present invention as described above. Thus, in FIG. 2, the same members as those in FIG. 1 as described above are given the same reference signs.

FIG. 3 is a flow sheet showing a third embodiment of an apparatus for carrying out an on-site regeneration method of a denitration catalyst in an exhaust gas purification system according to the present invention.

When referring to FIG. 3, a point at which this third embodiment is different from the case of the first embodiment of the present invention as described above resides in the matter that the reducing agent supply sub line (31) for supplying a reducing agent into the reducing agent oxidation catalyst layer (2) and an air supply sub line (33) for supplying air into the reducing agent oxidation catalyst layer (2) are provided separately from the reducing agent supply main line (13) for supplying a reducing agent into the exhaust gas on the upstream side of the denitration catalyst layer (1) and the air supply main line (14) for supplying air, respectively. That is, the reducing agent supply sub line (31) for supplying a reducing agent of the same kind as or a reducing agent (for example, methanol) of a different kind from the reducing agent (for example, ethanol) to be supplied into the exhaust gas on the upstream side of the denitration catalyst layer (1) is connected to the merge line (19) going to the reducing agent oxidation catalyst layer (2) (this point of issue is the same as that in the case of the second embodiment as described above). Meanwhile, with respect to the supply of air, the air supply sub line (33) for supplying air into the reducing agent oxidation catalyst layer (2) is provided separately from the air supply main line (14) for supplying air into the exhaust gas on the upstream side of the denitration catalyst layer (1). The valve (23) is provided in the air supply main line (14), and a valve (34) is provided in the air supply sub line (33). In addition, the heat exchanger (3) for air heating is installed in the exhaust line (12) on the downstream side of the denitration catalyst layer (1), and in the heat exchanger (3), the air passing within the air supply sub line (33) is heated by an exhaust heat of the purified exhaust gas discharged from the denitration catalyst layer (1). A tip of the air supply sub line (33) is connected to the merge line (19) going to the reducing agent oxidation catalyst layer (2).

Then, at the time of catalyst regeneration of the denitration catalyst layer (1), not only the valve (21) of the reducing agent supply main line (13) is closed, and the valve (32) of the reducing agent supply sub line (31) is opened, thereby switching the supply of the reducing agent to supply the reducing agent of the same kind or the reducing agent (for example, methanol) of a different kind from the reducing supply sub line (31) into the reducing agent oxidation catalyst layer (2), but also the valve (23) of the air supply main line (14) is closed, and the valve (34) of the air supply sub line (33) is opened, thereby switching the supply of air from the air supply main line (14) to the air supply sub line (33); and in the heat exchanger (3) installed in the exhaust line (12) on the downstream side of the denitration catalyst layer (1), the air passing within the air supply sub line (33) is heated by an exhaust heat of the purified exhaust gas, and this heated air is merged with the reducing agent and supplied into the reducing agent oxidation catalyst layer (2).

In the third embodiment of the present invention, other points are the same as those in the case of the first embodiment of the present invention as described above. Thus, in FIG. 3, the same members as those in FIG. 1 as described above are given the same reference signs.

In addition, the on-site regeneration method of a denitration catalyst in an exhaust gas purification system according to the present invention is, for example, carried out in other areas than ECA (Emission Control Area), or during a port call, or the like.

EXAMPLES

Next, Examples and Comparative Example of the present invention are explained, but it should not be construed that the present invention is limited to these Examples.

Example 1

The on-site regeneration method of a denitration catalyst in an exhaust gas purification system according to the present invention was carried out using the apparatus shown in the flow sheet shown in FIG. 1, and a change in NOx removal efficiency when the regeneration of a denitration catalyst was periodically performed was measured.

In purifying an exhaust gas of an internal combustion engine, such as a marine diesel engine, etc., a formulation of a pseudo-exhaust gas to be introduced into the denitration catalyst layer (1) was set to NO: 1,000 ppm, $SO_2$: 540 ppm, $SO_3$: 60 ppm, air: balance. In addition, an exhaust gas flow rate was set to 100 $Nm^3/h$, the moisture ($H_2O$) was set to 10 vol %, and ethanol was used in an amount of 2,000 ppm as the reducing agent.

Conditions of an evaluation test of denitration catalyst performance were summarized and shown in the following Table 1. In addition, a Co/zeolite denitration catalyst was used as the denitration catalyst capable of undergoing denitration at a temperature of 250° C. in the denitration catalyst layer (1). The Co/zeolite denitration catalyst is one obtained by suspending 10 g of a commercially available MFI type zeolite in an aqueous solution of 5.82 g of $Co(NO_3)_2 \cdot H_2O$ mixed in 194.18 g of ion exchange water, stirring the suspension at 80° C. overnight, followed by filtration and washing, and then drying at a temperature 100° C. for 3 hours.

TABLE 1

| Exhaust gas formulation | |
| --- | --- |
| NO | 1,000 ppm |
| $SO_2$ | 540 ppm |
| $SO_3$ | 60 ppm |
| Air | Balance |
| Exhaust gas flow rate | 100 $Nm^3/h$ |
| Reducing agent: EtOH | 2,000 ppm |
| Moisture | 10 (vol %) |
| Space velocity | 5,000/h |
| Reaction temperature | 250° C. |

To the exhaust gas on the upstream side of the denitration catalyst layer (1) installed in the exhaust passage (line) (11), a reducing agent-entrained air is added, and the nitrogen oxides in the exhaust gas are reduced in the denitrification catalyst layer (1), thereby purifying the exhaust gas. Here, the reducing agent composed of ethanol is supplied by the line (13), whereas the air is supplied by the line (14). The reducing agent-entrained air is introduced into the denitration catalyst layer (1) from the nozzle (16) by the merge line (15) and diffused over the whole of the catalyst.

By using a new article of the Co/zeolite denitration catalyst, the denitration reaction was carried out for 10 hours. As a result, the NOx removal efficiency was 91%.

Subsequently, the above-described purification system of the exhaust gas was operated for 100 hours, and thereafter, when the denitration performance of the catalyst of the denitration catalyst layer (1) was lowered, the following catalyst regeneration treatment was carried out.

[Regeneration Treatment]

At the time of catalyst regeneration of the denitration catalyst layer (1), not only the valve (22) of the reducing agent supply main line (13) was closed, and the valve (25) of the reducing agent supply branch line (17) was opened, thereby switching the supply of the reducing agent composed of ethanol from the reducing agent supply main line (13) to the reducing agent supply branch line (17), but also the valve (24) of the air supply main line (14) was closed, and the valve (26) of the air supply branch line (18) was opened, thereby switching the supply of air from the air supply main line (14) to the air supply branch line (18); and in the heat exchanger (3) installed in the exhaust line (12) on the downstream side of the denitration catalyst layer (1), the air passing within the air supply branch line (18) was heated by an exhaust heat of the purified exhaust gas, and this heated air was merged with the reducing agent in the merge line (19) and supplied into the reducing agent oxidation catalyst layer (2).

In this Example 1, $Pt/Al_2O_3$ was used as the oxidation catalyst of the reducing agent oxidation catalyst layer (2). Then, in the heat exchanger (3) for air heating installed in the purified gas exhaust line (12) on the downstream side of the denitration catalyst layer (1), the air was heated to a starting temperature (200° C.) of the oxidation catalyst by utilizing the exhaust heat of the purified exhaust gas discharged from the denitration catalyst layer (1), and the air thus heated to the starting temperature of the oxidation catalyst or higher was introduced into the oxidation catalyst layer (2).

In the reducing agent oxidation catalyst layer (2), the introduced reducing agent was oxidized with the oxidation catalyst ($Pt/Al_2O_3$), and the air was heated by its oxidation heat. The thus heated air was introduced into the denitration catalyst layer (1) to make the circulating gas temperature within the denitration catalyst layer (1) to 400° C. Then, by heating the catalyst by the circulating gas at 400° C. for one hour, the denitration catalyst was regenerated.

Subsequently, after subjecting the denitration catalyst to a regeneration treatment in this way, the passages of the air and the reducing agent were returned to the original states, respectively, and the denitration reaction was carried out by using the regenerated denitration catalyst. As a result, the NOx removal efficiency was 53%. A ratio to the new article, that is, a ratio of the NOx removal efficiency of the exhaust gas on the occasion of using this regenerated denitration catalyst to the NOx removal efficiency of the exhaust gas on the occasion of using the new article of the denitration catalyst was 0.58.

The heat treatment temperature (° C.) and the heat treatment time (h) of the denitration catalyst layer (1) at the time of denitration catalyst regeneration, the NOx removal efficiency of the exhaust gas on the occasion of using the regenerated denitration catalyst, and the ratio to the new article are summarized and shown in the following Table 2.

Examples 2 to 6

The on-site regeneration method of a denitration catalyst in an exhaust gas purification system according to the present invention is carried out in the same manner as that in the case of the foregoing Example 1. A point different from the case of the foregoing Example 1 resides in the matter that the heat treatment temperature (° C.) and/or the heat treatment time (h) of the denitration catalyst layer (1) at the time of denitration catalyst regeneration was changed.

That is, in Examples 2 to 4, the heat treatment temperature of the denitration catalyst layer (1) at the time of denitration catalyst regeneration was set to 450° C., 500° C., and 600° C., respectively. In addition, in Examples 5 and 6, while the heat treatment temperature (° C.) of the denitration catalyst layer (1) at the time of denitration catalyst regeneration was each set to 500° C., the heat treatment time was set to 0.5 hours and 2 hours, respectively.

Then, similar to the case of the foregoing Example 1, the purification system of exhaust gas was operated for 100 hours, and thereafter, when the performance of the denitration catalyst of the denitration catalyst layer (1) was lowered, the catalyst regeneration treatment was carried out by changing the heat treatment temperature (° C.) and/or the heating treatment time (h) of the denitration catalyst layer (1) at the time of denitration catalyst regeneration as described above. In each of these Examples, after subjecting the denitration catalyst to a regeneration treatment in this way, the passages of the air and the reducing agent were returned to the original states, respectively, and the denitration reaction was carried out by using the regenerated denitration catalyst. The results of the obtained NOx removal efficiency and the ratio to the new article of the NOx removal efficiency of the regenerated denitration catalyst are summarized and shown in the following Table 2.

Comparative Example 1

By using the apparatus shown in the flow sheet shown in FIG. 1, the exhaust gas purification system was carried out in the same manner as that in the case of the foregoing Example 1; however, even when the performance of the catalyst of the denitration catalyst layer (1) had been lowered, the purification by denitration of the exhaust gas was continuously carried out for 100 hours as it was without carrying out the catalyst regeneration treatment, followed by measuring the NOx removal efficiency of the exhaust gas.

The results of the obtained NOx removal efficiency and the ratio to the new article of the NOx removal efficiency at that time are summarized and shown in the following Table 2.

TABLE 2

| | Heat treatment | | Catalyst performance | |
| --- | --- | --- | --- | --- |
| | Temperature (° C.) | Time (h) | NOx removal efficiency (%) | Ratio to the new article |
| Example 1 | 400 | 1 | 53 | 0.58 |
| Example 2 | 450 | 1 | 71 | 0.78 |
| Example 3 | 500 | 1 | 88 | 0.97 |
| Example 4 | 600 | 1 | 87 | 0.96 |
| Example 5 | 500 | 0.5 | 75 | 0.82 |
| Example 6 | 500 | 2 | 89 | 0.98 |
| Comparative Example 1 | — | — | 40 | 0.44 |

As is evident from the results of the foregoing Table 2, in accordance with the on-site regeneration method of a denitration catalyst in an exhaust gas purification system in Examples 1 to 6 according to the present invention, it was understood that a carbon component deposited on the denitration catalyst is removed by an appropriate heat treatment, whereby a denitration catalyst performance can be recovered, and the heat treatment is performed on site, namely on a job site by using a reducing agent, air, and a reducing agent oxidation catalyst layer as exclusively installed, without using a conventional special heating apparatus or a fuel, thereby making it possible to regenerate the denitration catalyst.

In addition, it is confirmed from the results of the foregoing Table 2 that as for the heat regeneration conditions of the denitration catalyst, the temperature is desirably 500° C. or higher, and the time is desirably one hour or more.

Example 7

By using the apparatus shown in the flow sheet shown in FIG. 2, the on-site regeneration method of a denitration catalyst in an exhaust gas purification system according to the present invention was carried out, and a change of the NOx removal efficiency when the regeneration of the denitration catalyst was periodically performed was measured.

Here, a point different from the case of the foregoing Example 1 resides in the matter that the reducing agent composed of methanol which is different from the reducing agent composed of ethanol to be supplied into the exhaust gas on the upstream side of the denitration catalyst layer (1) was supplied into the reducing agent oxidation catalyst layer (2).

Then, at the time of catalyst regeneration of the denitration catalyst layer (1), not only the valve (21) of the reducing agent supply main line (13) was closed, and the valve (32) of the reducing agent supply sub line (31) was opened, thereby switching the supply of the reducing agent to supply the reducing agent composed of methanol of a different kind from the reducing supply sub line (31) into the reducing agent oxidation catalyst layer (2), but also the valve (24) of the air supply main line (14) was closed, and the valve(26) of the air supply branch line (18) was opened, thereby switching the supply of air from the air supply main line (14) to the air supply branch line (18); and in the heat exchanger (3) installed in the exhaust line (12) on the downstream side of the denitration catalyst layer (1), the air passing within the air supply branch line (18) was heated to 200° C. by an exhaust heat of the purified exhaust gas, and the air thus heated to a starting temperature of the oxidation catalyst or higher was merged with the reducing agent composed of methanol and introduced into the reducing agent oxidation catalyst layer (2).

In the reducing agent oxidation catalyst layer (2), the introduced reducing agent is oxidized with the oxidation catalyst (Pt/Al$_2$O$_3$), and the air is heated by its oxidation heat. The thus heated air was introduced into the denitration catalyst layer (1) to make the circulating gas temperature within the denitration catalyst layer (1) to 500° C. in the same manner as that in the case of the foregoing Example 3. Then, by heating the catalyst by the circulating gas at 500° C. for one hour, the denitration catalyst was regenerated.

Subsequently, after subjecting the denitration catalyst to a regeneration treatment in this way, the passages of the air and the reducing agent were returned to the original states, respectively, and the denitration reaction was carried out by using the regenerated denitration catalyst. As a result, the NOx removal efficiency was 88%. A ratio to the new article, that is, a ratio of the NOx removal efficiency of the exhaust gas on the occasion of using this regenerated denitration catalyst to the NOx removal efficiency of the exhaust gas on the occasion of using the new article of the denitration catalyst was 0.97, and the same results as those in the case of the foregoing Example 3 were obtained.

REFERENCE SIGNS LIST

1: Denitration catalyst layer
2: Reducing agent oxidation catalyst layer
3: Heat exchanger for air heating
11: Exhaust line of internal combustion engine (exhaust passage)
12: Exhaust line
13: Reducing agent supply main line
14: Air supply main line
15: Merge line
16: Nozzle
17: Branch line
18: Air supply branch line
19: Merge line
20: Line
21 to 27: Valve
31: Another reducing agent supply sub line
32: Valve
33: Air supply sub line
34: Valve

The invention claimed is:

1. An on-site regeneration method of a denitration catalyst in an exhaust gas purification system, comprising:
adding a reducing agent-entrained air to an exhaust gas on the upstream side of a denitration catalyst layer installed in an exhaust passage of an internal combustion engine thus reducing nitrogen oxides in the exhaust gas in the denitration catalyst layer, thereby purifying the exhaust gas;
providing a reducing agent oxidation catalyst layer outside of the exhaust gas passage;
supplying a reducing agent and air into the reducing agent oxidation catalyst layer at the time of catalyst regeneration of the denitration catalyst layer to produce a reaction heat generated by an oxidation reaction of the reducing agent and the air in this reducing agent oxidation catalyst layer to create a high-temperature oxidation reaction gas;

supplying this high-temperature oxidation reaction gas into the denitration catalyst layer to heat the denitration catalyst, thereby regenerating the denitration catalyst, providing a reducing agent supply branch line on the way of a reducing agent supply main line for supplying the reducing agent into the exhaust gas on the upstream side of the denitration catalyst layer; and providing an air supply branch line on the way of an air supply main line for supplying air into the exhaust gas on the upstream side of the denitration catalyst layer;

wherein the reducing agent supply branch line and the air supply branch line are connected to the reducing agent oxidation catalyst layer; and at the time of catalyst regeneration of the denitration catalyst layer, not only the supply of the reducing agent is switched from the reducing agent supply main line to the reducing agent supply branch line, but also the supply of air is switched from the air supply main line to the air supply branch line, thereby supplying the reducing agent and air into the reducing agent oxidation catalyst layer.

2. The on-site regeneration method of a denitration catalyst in an exhaust gas purification system according to claim 1, wherein a heating temperature of the denitration catalyst by the high-temperature oxidation reaction gas is 500° C. to 800° C.

3. The on-site regeneration method of a denitration catalyst in an exhaust gas purification system according to claim 1, further comprising:

installing a heat exchanger for air heating in an exhaust passage on the downstream side of the denitration catalyst layer;

wherein in the heat exchanger, air is heated by an exhaust heat of a purified exhaust gas discharged from the denitration catalyst layer; and this heated air is supplied into the reducing agent oxidation catalyst layer, thereby causing an oxidation reaction of the reducing agent and the air.

4. The on-site regeneration method of a denitration catalyst in an exhaust gas purification system according to claim 1, wherein the reducing agent is at least one organic compound selected from the group consisting of alcohols, ethers, ketones, and hydrocarbons, and air is added to the exhaust gas on the upstream side of the denitration catalyst layer together with a vaporized reducing agent.

5. An on-site regeneration method of a denitration catalyst in an exhaust gas purification system comprising:

adding a reducing agent-entrained air to an exhaust gas on the upstream side of a denitration catalyst layer installed in an exhaust passage of an internal combustion engine thus reducing nitrogen oxides in the exhaust gas in the denitration catalyst layer, thereby purifying the exhaust gas;

providing a reducing agent oxidation catalyst layer outside of the exhaust gas passage;

supplying a reducing agent and air into the reducing agent oxidation catalyst layer at the time of catalyst regeneration of the denitration catalyst layer to produce a reaction heat generated by an oxidation reaction of the reducing agent and the air in this reducing agent oxidation catalyst layer to create a high-temperature oxidation reaction gas;

supplying this high-temperature oxidation reaction gas into the denitration catalyst layer to heat the denitration catalyst, thereby regenerating the denitration catalyst, providing a reducing agent supply sub line for supplying a reducing agent of the same kind as or a reducing agent of a different kind from the reducing agent to be supplied into the exhaust gas on the upstream side of the denitration catalyst layer is connected to the reducing agent oxidation catalyst layer; and providing an air supply branch line on the way of an air supply main line for supplying air into the exhaust gas on the upstream side of the denitration catalyst layer; this air supply branch line is connected to the reducing agent oxidation catalyst layer; and at the time of catalyst regeneration of the denitration catalyst layer, not only the reducing agent of the same or the reducing agent of a different kind is supplied from the reducing agent supply sub line into the reducing agent oxidation catalyst layer, but also the supply of air is switched from the air supply main line to the air supply branch line, thereby supplying air into the reducing agent oxidation catalyst layer.

6. An on-site regeneration method of a denitration catalyst in an exhaust gas purification system comprising:

adding a reducing agent-entrained air to an exhaust gas on the upstream side of a denitration catalyst layer installed in an exhaust passage of an internal combustion engine thus reducing nitrogen oxides in the exhaust gas in the denitration catalyst layer, thereby purifying the exhaust gas;

providing a reducing agent oxidation catalyst layer outside of the exhaust gas passage;

supplying a reducing agent and air into the reducing agent oxidation catalyst layer at the time of catalyst regeneration of the denitration catalyst layer to produce a reaction heat generated by an oxidation reaction of the reducing agent and the air in this reducing agent oxidation catalyst layer to create a high-temperature oxidation reaction gas;

supplying this high-temperature oxidation reaction gas into the denitration catalyst layer to heat the denitration catalyst, thereby regenerating the denitration catalyst, providing reducing agent oxidation catalyst layer with a reducing agent supply sub line for supplying a reducing agent of the same kind as or a reducing agent of a different kind from the reducing agent to be supplied into the exhaust gas on the upstream side of the denitration catalyst layer and an air supply sub line for supplying air into the reducing agent oxidation catalyst layer separately from a reducing agent supply main line for supplying a reducing agent into the exhaust gas on the upstream side of the denitration catalyst layer; and providing an air supply main line for supplying air, wherein at the time of catalyst regeneration of the denitration catalyst layer, not only the reducing agent of the same or the reducing agent of a different kind is supplied from the reducing agent supply sub line into the reducing agent oxidation catalyst layer, but also air is supplied from the air supply sub line.

* * * * *